Feb. 12, 1963   M. R. GEHRKE   3,077,292
HARNESS, DEER DRAG AND THE LIKE
Filed Aug. 24, 1960

INVENTOR
MAX R. GEHRKE

BY Wright & Wright

ATTORNEYS

United States Patent Office 3,077,292
Patented Feb. 12, 1963

3,077,292
HARNESS, DEER DRAG AND THE LIKE
Max R. Gehrke, Wautoma, Wis.
Filed Aug. 24, 1960, Ser. No. 51,610
1 Claim. (Cl. 224—5)

This invention appertains to harnesses and more particularly to a new and improved harness for fitting about a person to drag heavy loads such as a felled deer or the like.

When hunting big game such as deer and the like, one of the primary hardships is dragging the felled animal to a place where it can be otherwise transported. One method used has been to attach some sort of a rope around the antlers or neck of the animal, place a stick through a loop formed in the other end of the rope and with one person on each side of the animal, holding onto the stick, drag the deer or animal to a road or trail. This is difficult enough when there are two or more people available, but a single person would have great difficulty in moving the deer any appreciable distance by this method.

Another method, particularly when a single person is attempting to drag the deer, is to attach a rope to one's belt with the other end attached to the antlers of the deer and attempt to drag the deer in this manner. However, this pulls in on the stomach and interferes with the normal breathing of the individual.

There has, therefore, been a need for some sort of hardness arrangement for dragging the felled animal some appreciable distance.

A primary object of my present invention is to provide a hardness of the deer drag type which can be comfortably worn by an individual and will enable him to drag the felled animal in an efficient and comfortable manner.

A further important object of my present invention is to provide a harness having a belt portion around the waist and a pair of shoulder straps which cross approximately mid-way of the back of an individual so that the front chest portion of the individual is left free so as not to interfere with the normal breathing process.

A salient feature of my present invention resides in providing a new and improved harness having a belt around the waist, shoulder straps attached to the front of the belt, going straight up and crossing at the mid-back portion of the individual and at which point a ring is secured. The ring receives or holds the drag rope so that the load is centered properly for the most efficient effort of an individual in dragging a deer.

Another important object of my present invention is to provide a deer drag which can be utilized by one individual and is so designed that the load will be distributed so as to eliminate interference with the normal breathing process and so as to give the maximum pull without unduly burdening the legs or lower portions of the body.

A still further object of my present invention is to provide a simple, practical, and reliable construction that is economical to manufacture, easy to assemble and positive in its operation.

Another object is that by utilizing my deer drag a person can hold his weapon in a safe position so that safety to individuals is taken into consideration and the gun is not man-handled.

With the above and other objects in view, which will become more apparent as the description proceeds, the same consists in the novel construction, combination and arrangement of parts, hereinafter more fully described, illustrated and claimed.

A preferred and practical embodiment of my invention is shown in the accompanying drawings, in which.

Figure 2:
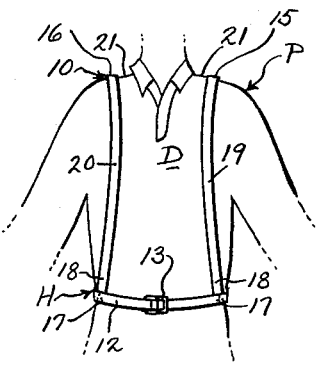
FIGURE 2 is a front elevational view showing the harness in position with relation to the individual.

Referring now to the drawings in detail wherein similar reference characters designate corresponding parts throughout the several views, the letter H generally indicates my novel harness and deer drag and the same includes broadly, the harness 10 and the drag rope 11. The harness includes a lower belt strap 12 adapted to fit around the waist of an individual and this belt can be formed of any desired flexible material but in the preferred form, the entire harness is made of webbing. This belt or waist strap 12 is also provided with any suitable type of buckle 13 so that the end 14 can be adjustably secured to the waist as desired. Secured to the front and back portions of the belt are a pair of shoulder straps 15 and 16 respectively and each strap is secured at the front portion 17 of the belt by sewing or riveting the ends 18 as shown. It is important to note that each shoulder strap 15 and 16 extends upwardly in an approximately vertical position to provide straps 19 and 20 respectively which overlie the chest and upper shoulders of a person P, as particularly shown in FIGURE 2 of the drawings and it is also to be noted that this, therefore, leaves the center and diaphragm portions of the chest D free from the pull of the load. The straps 15 and 16 respectively then continue over the shoulders 21 and cross over one another as at 22 and their respective ends 23 and 24 are then fastened to the rear portion 25 of the belt or strap 12. At the point 22 where the shoulder straps cross, I secure a metal ring 26 and it is also important to note that the point 22 where the shoulder straps cross should be approximately the mid-back portion of an individual and located between the shoulder blades and it should be noted that the straps are also sewed or riveted as indicated by the numeral 27 at this point. Obviously, if desired, I may make each shoulder strap 15 and 16 adjustable so that my novel harness can accommodate all sizes of individuals.

Figure 1:
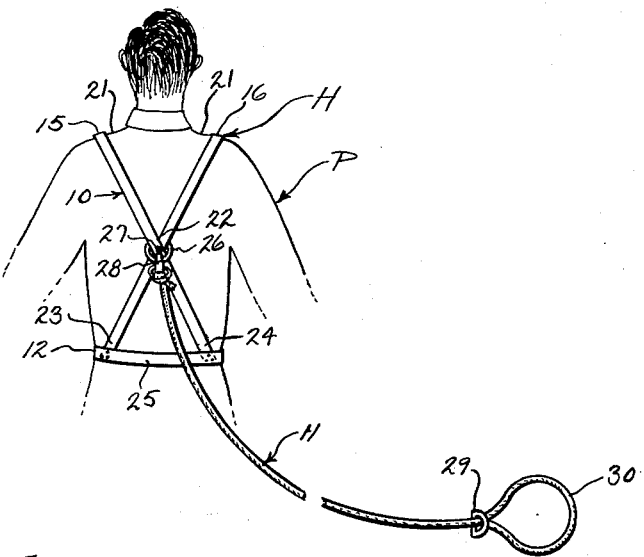
FIGURE 1 is a rear elevational view of my novel harness and deer drag showing the same in proper position on an individual.
Figure 3:
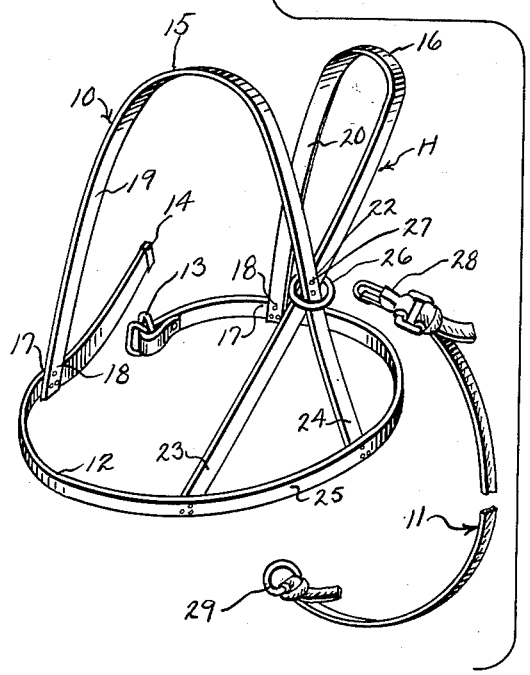
FIGURE 3 is a perspective view of my harness shown removed from the individual and clearly illustrating details of construction.

Associated with the harness is the drag rope 11 and while this rope may be made of any suitable material, I prefer to utilize braided nylon due to the fact that this nylon is extremely strong and long-wearing. To one end of the rope, I affix a snap fastener 28 which can be easily secured to the ring 26 and to the other end of the drag rope 11 I secure a small metal ring 29. Obviously, a portion of the rope can be positioned through the ring 29 to form a loop 30 shown in FIGURE 1 and this rope loop 30 can be placed around the antlers or neck of the felled animal.

Thus it can be seen that an individual utilizing my novel harness and deer drag can pull the deer to a spot where it can be further transported and that the weight or load pull is centered in the middle of the back for the most efficient load distribution, the shoulders absorbing the rest of the load and further (note FIGURE 2), the middle chest portion D of a person is free so that the breathing will not be interfered with.

Further, an individual does not have to worry about his gun in that he has both hands free to hold the weapon in a proper, safe position and therefore, this harness also aids measurably in the safety factor when hunting or dragging the felled animal.

From the foregoing, it is believed that the features and advantages of my novel deer drag will be readily apparent to those skilled in the art and it will of course be understood that changes in the form, proportion and minor details of construction may be resorted to without departing from the spirit of the invention or the scope of the appended claim.

I claim:

A deer drag harness having a front and rear portion comprising, a belt adapted to extend around the waistline of the wearer, means for adjustably securing said belt in position, a pair of shoulder straps, each having one end attached to the belt adjacent the front portion of said harness, said point of attachment of each strap being spaced appreciably from the other so that when the belt is in position about the waistline of the wearer each respective front end will be adapted to lie adjacent the front portion of the respective hip of the wearer, each strap extending substantially vertically from the said front end attachment of the belt and adapted to extend over the shoulder, and said straps adapted to cross at a point midway of the back of the wearer but between the shoulder blades, each strap having its other end secured to a rear portion of said belt and harness at a point lying adjacent the rear portion of the hip of a wearer when the belt is about the waistline of a wearer, a metal ring secured at the point where the straps cross and extending outwardly therefrom, and a drag rope carrying a snap fastener on one end for securing said rope to said ring, and means on the other end thereof for attaching to the antlers and neck of a deer or the like, whereby the load pressure is adapted to be equally distributed with the mid chest section of the wearer being free from stress and pressure.

References Cited in the file of this patent

UNITED STATES PATENTS

| | | |
|---|---|---|
| 1,816,262 | Ritter | July 28, 1931 |
| 2,130,724 | Lewis | Sept. 20, 1938 |
| 2,592,771 | Wampler | Apr. 15, 1952 |
| 2,699,284 | Rose | Jan. 11, 1955 |
| 2,715,989 | Sjodin et al. | Aug. 23, 1955 |